Jan. 11, 1938.                A. C. C. HANSEN                2,105,437
                      BEVEL PINION MOUNTING FOR TRANSMISSIONS
                              Filed Oct. 14, 1936
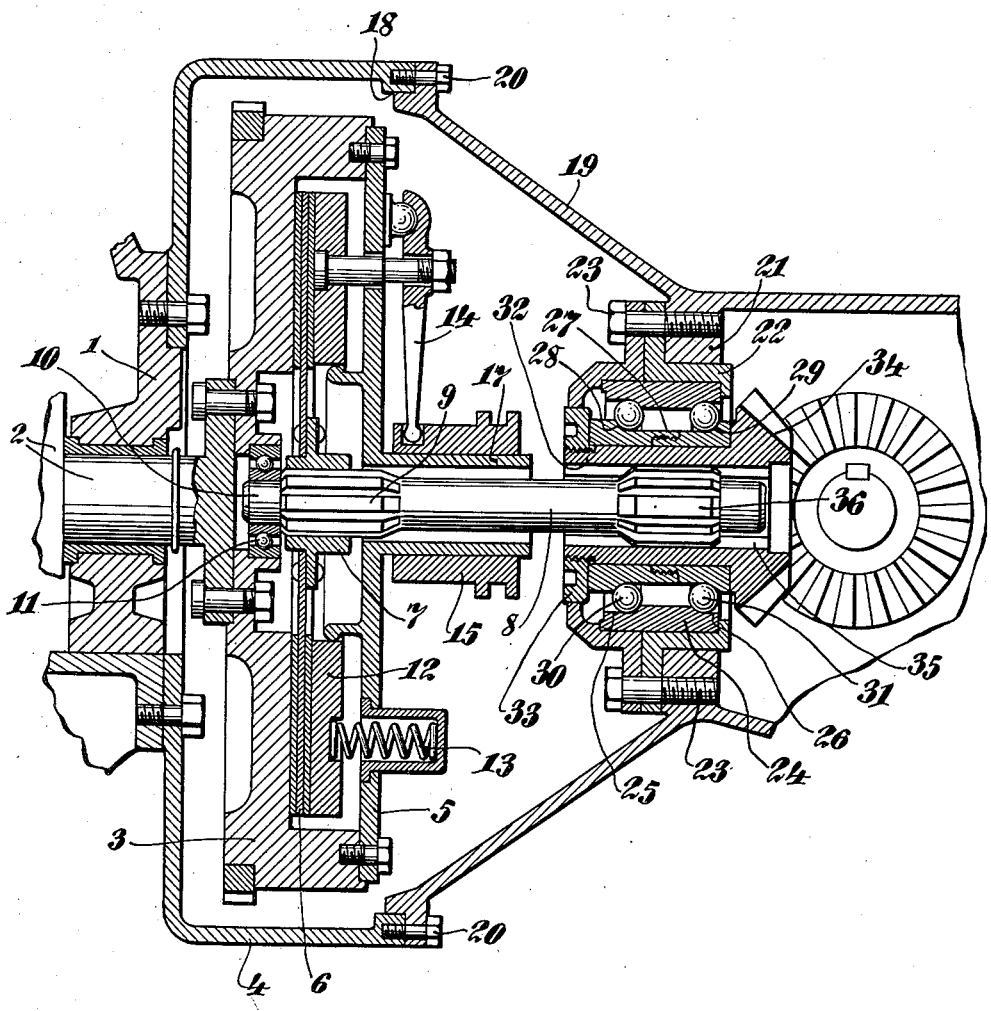
                                                    INVENTOR.
                                               Aage C. C. Hansen,
                                      BY   Hoguet, Neary & Campbell,
                                                   HIS ATTORNEYS Patented Jan. 11, 1938

2,105,437

UNITED STATES PATENT OFFICE 2,105,437

BEVEL PINION MOUNTING FOR TRANSMISSIONS

Aage C. C. Hansen, Lindeneau, N. J., assignor to Mack Manufacturing Corporation, a corporation of Delaware Application October 14, 1936, Serial No. 105,459

2 Claims. (Cl. 74—398)

The present invention relates to bevel pinion mountings for transmission mechanisms and embodies, more specifically, an improved pinion and mounting structure by means of which a driving connection between the clutch and transmission mechanism in certain existing forms of these devices is so constructed as to not only facilitate the construction and assembly of the elements, but also to insure effective operation thereof during service and prevent the misalignment and constant stresses resulting therefrom which frequently are found in existing mechanisms.

In existing mechanisms where the pinion and shaft are formed of one piece, the pinion end of the shaft is now supported by a single row ball bearing. It is extremely difficult to fit a bell housing to an engine and have the opening concentric with the crank shaft. If the opening is not concentric to the crank shaft, misalignment will result in the driving elements and consequent strain and destructive forces will be present in the mechanism, especially causing improper engagement of the gear teeth.

In accordance with the present invention, a construction is provided whereby the foregoing misalignment which frequently and unavoidably exists is provided for by the construction and mounting of these elements. More particularly, the invention has for an object the provision of a mounting for the bevel pinion of a transmission wherein the shaft which receives power from the clutch and supplies it to the transmission is so connected and carried by the pinion that provision for a degree of universal motion is made, thus taking care of any misalignment resulting from the inaccuracies in construction of the elements and the assembly of the bell housing to the motor.

A further object of the invention is to provide an effective mounting for a bevel pinion, the construction being such as to maintain a desired positional relationship between the bevel pinion and the transmission mechanism regardless of the relationship existing between the bevel pinion and the driving element therefor.

Further objects of the invention will be apparent as it is described in further detail in connection with the accompanying drawing, wherein the single figure illustrates a bevel pinion mounting constructed in accordance with the present invention, the view being a sectional view taken through the axis of the mechanism.

In the above drawing, the crank case of the engine is shown at 1, the engine crank shaft being illustrated at 2 and being connected to a flywheel 3 in the usual fashion. A clutch bell housing is shown at 4 to receive and enclose the clutch mechanism which may be of standard form. For example, the flywheel 3 may be provided with a plate 5 forming a closure within which a clutch disc 6 is received, the clutch disc being mounted upon a hub 7 which is mounted upon a shaft 8 through a spline connection 9. The adjacent end of the shaft 8 is formed with an extension 10 which is mounted within a bearing 11, formed centrally of the flywheel. A pressure plate 12 is carried by the plate 5, springs 13 normally urging the plate into engagement with the clutch disc 6. Levers 14 of the usual type are carried by the plate 5 and the inwardly extending ends thereof are received within recesses carried by a sleeve 15 which is slidably mounted upon a cylindrical extension 17 of the plate 5. The sleeve 15 is suitably actuated in the usual fashion by means of a yoke mechanism which is not shown here inasmuch as it will be well understood by those skilled in the art. The bell housing 4 is provided with an opening 18 within which a transmission case 19 is received, the transmission case being secured to the bell housing by means of bolts 20.

A cylindrical shoulder 21 is formed within the transmission case, a bearing retainer 22 being secured to the shoulder by means of bolts 23. The bearing retainer receives a bearing formed with an outer ring 24 having a relatively extended axial length and formed with spaced bearing races 25 and 26. The bearing is also provided with an inner ring 27 formed with spaced races 28 and 29 cooperating with the respective races 25 and 26 to receive the respective series of ball bearings 30 and 31. It will be seen that the races 28 and 29 are spaced further apart than the races 25 and 26, and lines drawn through the point of contact of the balls of each series 30 and 31 with the races will lie at an angle in relation to the axis of the bearing.

Within the inner race is carried a bevel pinion sleeve 32 secured in position by means of a nut 33 and formed with a bevel pinion 34 of usual construction. The sleeve 32 is formed with splines 35 which cooperate with splines 36 formed on shaft 38 and serve as a driving connection between the shaft and sleeve. The splines on the shaft 8 are preferably made with a slight crown at their centers and are sufficiently free fitting to permit a slight angular movement between the pinion sleeve and the shaft 8.

By means of the foregoing construction, the bearing carried by the retainer 22 forms the entire support for the pinion 34 and, due to the angularity between the points of contact of the races with the respective balls, the pinion 34 is effectively supported rotatably against both radial and thrust loads. Inasmuch as the spline connection between the sleeve 32 and shaft 8 permits of a degree of angularity existing between these elements, misalignment of the sleeve 32 with the crank shaft 2 will be taken care of by the splines at either end of shaft 8, thus not disturbing the alignment of the bevel gear 34 and subjecting it to the stresses which have heretofore been impressed thereon due to misalignment. By using a wide single bearing to support the pinion sleeve 32, a more rigid and less costly construction is obtained in the limited space available than could be obtained if two separate bearings were used to support the pinion.

It will thus be seen that a pinion mounting has been provided wherein misalignment between the pinion and the crank shaft is effectively provided for, at the same time providing an effective mounting for the pinion and the driving elements therefor.

While the invention has been described with specific reference to the construction shown in the accompanying drawing, it is not to be limited save as defined in the accompanying claims.

I claim:

1. In combination with a power transmitting mechanism, a driving member, a hollow driving pinion, antifriction bearings supporting said pinion, said pinion having internal splines within the plane of said antifriction bearings, a shaft extending from the driving member to within said pinion and having splines adapted to engage said internal splines, the splines of said pinion and said shaft having sufficient freedom to permit angular displacement between said shaft and said pinion, means to support and journal said shaft in said driving member, and means carried by said driving member to drive said shaft.

2. In combination with a power transmitting mechanism, a driving member, a hollow driving pinion, antifriction bearings supporting said pinion, said pinion having internal splines within the plane of said antifriction bearings, a shaft extending from the driving member to within said pinion and having splines adapted to engage said internal splines, the splines of said shaft being crowned to permit angular displacement between said shaft and said pinion, means to support and journal said shaft in said driving member, and means carried by said driving member to drive said shaft.

AAGE C. C. HANSEN.